(12) United States Patent
Stavi et al.

(10) Patent No.: US 10,356,452 B2
(45) Date of Patent: Jul. 16, 2019

(54) ENSURING A TARGET AVERAGE BIT RATE IN A MULTIPLEXED ENVIRONMENT

(71) Applicant: Harmonic, Inc., San Jose, CA (US)

(72) Inventors: Yoed Stavi, Zikhron Ya'akov (IL); Raz Nitzan, Caesarea (IL)

(73) Assignee: Harmonic, Inc., San Jose, CA (US)

( * ) Notice: Subject to any disclaimer, the term of this patent is extended or adjusted under 35 U.S.C. 154(b) by 60 days.

(21) Appl. No.: 15/627,739

(22) Filed: Jun. 20, 2017

(65) Prior Publication Data
US 2018/0367825 A1 Dec. 20, 2018

(51) Int. Cl.

| | |
|---|---|
| *H04N 21/236* | (2011.01) |
| *H04N 21/238* | (2011.01) |
| *H04N 21/2365* | (2011.01) |
| *H04N 21/442* | (2011.01) |
| *H04N 21/43* | (2011.01) |
| *H04N 21/438* | (2011.01) |
| *H04N 21/2385* | (2011.01) |

(52) U.S. Cl.
CPC ... *H04N 21/23655* (2013.01); *H04N 21/2365* (2013.01); *H04N 21/2385* (2013.01); *H04N 21/23608* (2013.01); *H04N 21/23805* (2013.01); *H04N 21/4307* (2013.01); *H04N 21/4383* (2013.01); *H04N 21/44209* (2013.01)

(58) Field of Classification Search
CPC ....... H04N 21/23418; H04N 21/23608; H04N 21/2365; H04N 21/23655
See application file for complete search history.

(56) References Cited

U.S. PATENT DOCUMENTS

| | | | |
|---|---|---|---|
| 7,173,947 B1 * | 2/2007 | Ramakrishnan | ............................ H04N 21/23418 370/242 |
| 2014/0139733 A1 * | 5/2014 | MacInnis | ............. H04N 19/124 348/441 |

* cited by examiner

*Primary Examiner* — Raj Jain
(74) *Attorney, Agent, or Firm* — Brokaw Patent Law PC; Christopher J. Brokaw

(57) ABSTRACT

Ensuring a long-term average bitrate for channels of a statistical multiplexing meets or exceeds a specified limit. An arbitrary target average bitrate for each of a set of channels of the statistical multiplexer is received. The long-term average bit rate for each channel of the statistical multiplexer is tracked. For each allocation cycle of the statistical multiplexer, bitrates to each encoder are assigned by splitting a bit allocation pool of the statistical multiplexer into a first portion and a second portion. The first portion is allocated to maximize video quality and the second portion is allocated to minimize a gap between the set of channels that are below their arbitrary target average bitrate based on the long-term average bit rate for the set of channels. Thereafter, the bit rates allocated from the first and second portions are distributed to the encoders encoding/transcoding the set of channels.

18 Claims, 4 Drawing Sheets

& # x20;

ENSURING A TARGET AVERAGE BIT RATE IN A MULTIPLEXED ENVIRONMENT

FIELD OF THE INVENTION

Embodiments of the invention generally relate to statistical multiplexing of digital video.

BACKGROUND

In traditional statistical multiplexing, a communication channel is divided into an arbitrary number of variable bit rate digital channels or data streams. The number of bits allocated to each of the digital channels is dynamically adjusted by an encoder many times a second based on the complexity of the digital video carried by each channel. The complexity of digital video is a measure of how much data (or 'bits') is required to describe how to display the digital video. When a particular channel requires an increase in bits to sufficiently describe the complexity of digital video carried thereby, additional bits can be allocated to that channel from another channel which is not using all of its assigned bits at that moment.

With traditional statistical multiplexing systems, it is not possible to guarantee how the distribution of bit rates between channels will be conducted with much precision over long intervals of time. The total amount of bit rate available for distribution (a "bit rate pool") is traditionally distributed according to the complexity of the digital video carried by those channels, and as such, the dominant consideration in distributing bit rates amongst channels is to keep the video quality of the digital video carried by each channel as high as possible.

In some use cases, commercial considerations and/or contractual obligations call for a "fair" or arbitrary distribution of bit rate for a particular channel over time. For example, one or more channels of a statistical multiplexing system may need to operate such that a certain amount of bit rates must be allocated to those channels over a particular time interval. When faced with such constraints, it is not possible to use traditional statistical multiplexing.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
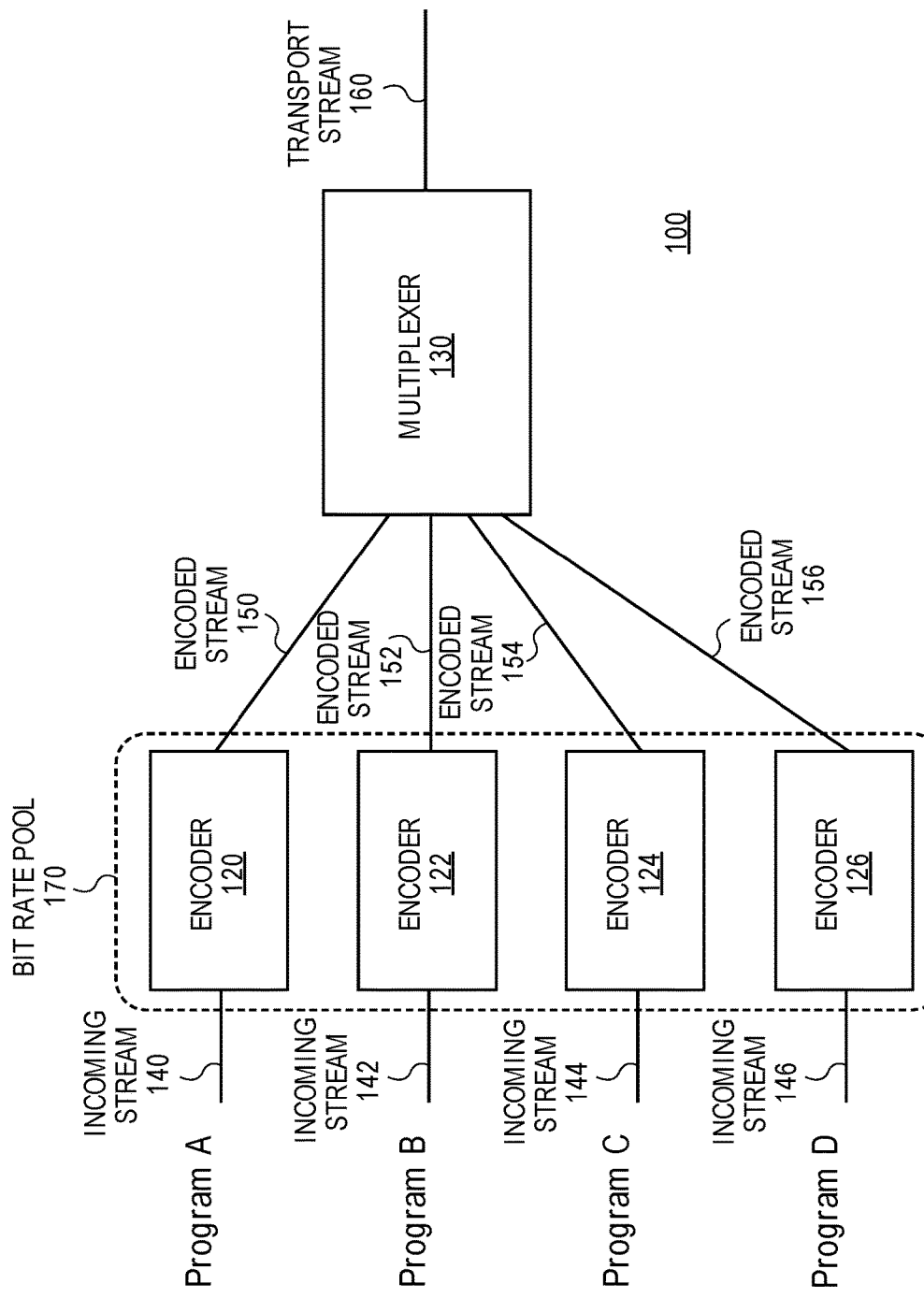
FIG. 1 is a block diagram of the functional components of system according to the current state of the art.

Approaches for ensuring that a long-term average bitrate for channels of a statistical multiplexing meets or exceeds a specified limit are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Broadcast companies may charge other parties, such as content providers, a fee to distribute their content. The amount charged by broadcast companies to distribute digital content may be based, at least in part, upon the bit rate at which the digital content is to be delivered. If a content provider pays for digital content to be delivered at a certain bit rate, then for many reasons it is desirable for the broadcaster to actually deliver the digital content at the agreed upon bit rate. Unfortunately for the broadcaster, with traditional statistical multiplexing systems, it is not possible to guarantee how the distribution of bit rates between channels will be conducted. In order to guarantee that digital content is delivered in accordance with an agreed upon average bit rate, the broadcaster cannot use traditional statistical multiplexing systems and instead, is required to deliver digital content using a constant bit rate. Without the use of some form of statistical multiplexing, the broadcaster is unable to make efficient use of its available bit rates at its disposal and, by extension, the broadcaster sacrifices a certain amount of video quality in the distributed digital content.

Embodiments of the invention address and overcome this disadvantage of the current state of the art. Embodiments allow a target average bit rate to be established for one or more digital programs to be distributed. The one or more digital programs may each be carried by a separate channel that uses a statistical multiplexer of an embodiment to distribute bit rates to channels in a manner that ensures that the target average bit rate for each channel is met over a period of time, such as a few hours, without sacrificing the video quality of the digital video carried by those channels. The duration of time required to reach the target average bit rate for a particular channel may depend on the complexity of the digital content carried those channels input to the multiplexer and upon on a convergence aggressiveness parameter which may be configured and/or controlled by a user.

Embodiments have particular applicability to broadcasters that need to ensure an average delivery bit rate, per digital video channel, does not fall below a certain minimum. Such a need may arise due to contractual obligations undertaken by the broadcaster.

According to an embodiment of the invention, an arbitrary target average bit rate for one or more channels of a statistical multiplexer are established. The long-term average bit rate for each of the one or more channels is tracked. The long-term average bit rate for each channel may be tracked by the multiplexer. Based on the long-term average bit rate for the one or more channels, how bit rates are allocated to those one or more channels is adjusted to ensure that the one or more channels meet or exceed the established arbitrary target average bit rate for those channels.

To do so, in an embodiment, in a single allocation cycle of the statistical multiplexer, a bit allocation pool of the statistical multiplexer is split into a first portion and a second portion. The first portion is distributed to encoders to maximize video quality and the second portion is distributed to encoders in a way that minimizes the gap for channels that are behind their target average bit rate. Thus, in a single allocation cycle, encoders may receive a distribution from the first portion and from the second portion of the bit allocation pool.

Further approaches and advantages shall be discussed in additional detail below.

Prior Art Statistical Multiplexing

Before describing how embodiments of the invention operate in additional detail, it will be helpful to appreciate the operation of certain prior art approaches. FIG. 1 is a block diagram of the functional components of system 100 according to the current state of the art. System 100 includes encoders 120, 122, 124, and 126, multiplexer 130, and bit rate pool 170. Encoders 120, 122, 124, and 126 individually refer to hardware or software components responsible for converting an incoming digital video stream (expressed in a first digital video format) to an encoded digital video stream (expressed in a second and different digital video format).

For example, encoders 120, 122, 124, and 126 may respectively convert incoming digital video streams 140, 142, 144, and 146 from a first digital video format to encoded streams 150, 152, 154, and 156, each of which is expressed in digital video format different from which incoming streams 140, 142, 144, and 146 are expressed. It may be advantageous or necessary to change the format in which a digital video file is expressed for a variety of reasons, such as to achieve, gain, or promote standardization, speed, secrecy, security, and/or compression.

Each of incoming digital video streams 140, 142, 144, and 146 may comprise one or more units of digital video, e.g., a program. For purposes of providing a clear explanation, it shall be assumed in the description below that digital video streams 140, 142, 144, and 146 each carry a single program at a time.

Multiplexer 130 refers to a hardware or software component for combining multiple encoded streams, such as encoded streams 150, 152, 154, and 156 into a single transport stream, such as transport stream 160. Digital streams 150, 152, 154, and 156 each become embedded in transport stream 160 as is, i.e., without any manipulation to the video or audio content and bit rate. Digital streams 150, 152, 154, and 156, as broadly used herein, represent encoded digital streams produced by approaches where the encoder and the multiplexer are communicating over a network as well as other approaches where the encoder and multiplexer share hardware and may communicate directly with one another.

A bit rate pool refers to a total amount of bit rates that are available for encoding one or more programs organized in a group. For example, as depicted in FIG. 1, bit rate pool 170 refers to the total amount of bit rates available for encoding incoming streams 140, 142, 144, and 146. In this way, multiplexer 130 instructs encoders 120, 122, 124, and 126 to encode incoming streams 140, 142, 144, and 146 in a way such that the sum of their encoded bit rate is equal to or no greater than the size of bit rate pool 170 for a particular allocation cycle of multiplexer 130.

The content based on incoming stream 140 is delivered by the broadcaster in transport stream 160. If a broadcaster wishes to ensure that incoming stream 140 is delivered at a particular average bit rate over time in transport stream 160, then the broadcaster has no means to do so using system 100.

System 100 provides no mechanism to enforce what average bit rate content in incoming stream 140 will be delivered at in transport stream 160. Therefore, if the broadcaster is under an obligation to broadcast Program A carried by incoming stream 140 at a particular average bit rate, the broadcaster would be required to use a constant bit rate system.

Enforcing Target Average Bit Rates Over Time

Figure 2:
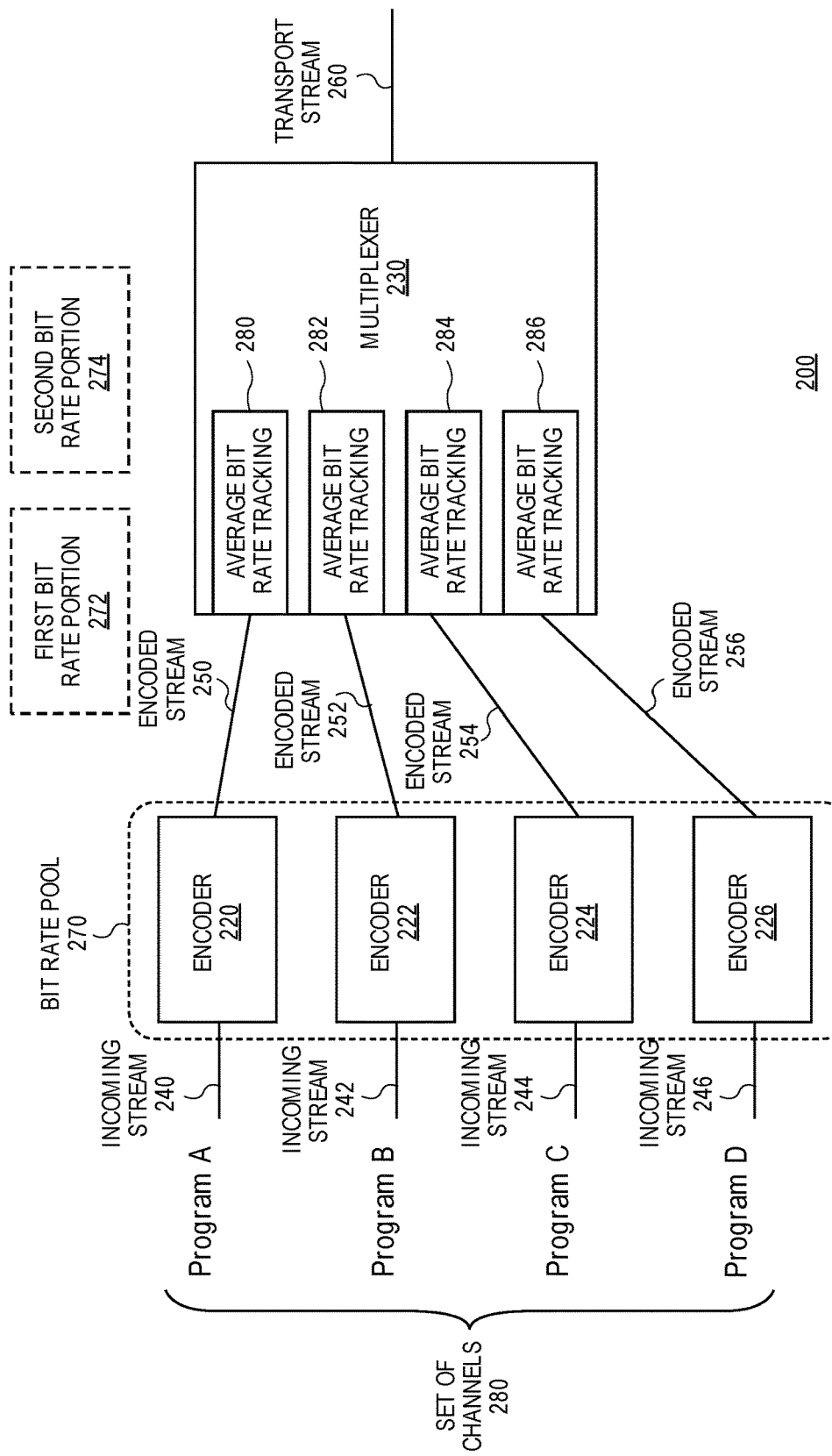
FIG. 2 is a block diagram of the functional components of system according to an embodiment of the invention.

Turning now to embodiments of the invention, FIG. 2 is a block diagram of the functional components of system 200 according to an embodiment of the invention. System 200 of FIG. 2 contains several components also present within system 100 of FIG. 1; however, as shall be explained below, multiplexer 230 operates in accordance with a different set of operational principles than multiplexer 130 of the prior art.

Incoming streams 240, 242, 244, 246 represent the same type of digital streams as those depicted in FIG. 1. Similarly, encoders 220, 222, 224, and 226 operate as encoders present in system 100. Encoders 220, 222, 224, and 226 as well as multiplexer 230 may be embodied in a hardware device, in software, or in a combination thereof.

System 200 includes bit rate pool 270, which refers to a total amount of bit rates that are available for encoding set of channels 280. Thus, the sum of all bit rate allocations made by multiplexer 230 to encoders processing each channel in set of channels 280 in a single allocation cycle cannot exceed the size of bit rate pool 270. Note that the number of channels in set of channels 280 is arbitrary and may include any number of channels.

System 200 includes multiplexer 230. Multiplexer 230 comprises one or more average bit rate tracking components, such as average bit rate tracking components 280, 282, 284, and 286. Any broadly used herein, an average bit rate tracking component refers to any mechanism, be it hardware or software, for tracking and maintaining the average bit rate of a particular channel of multiplexer 230.

Figure 3:
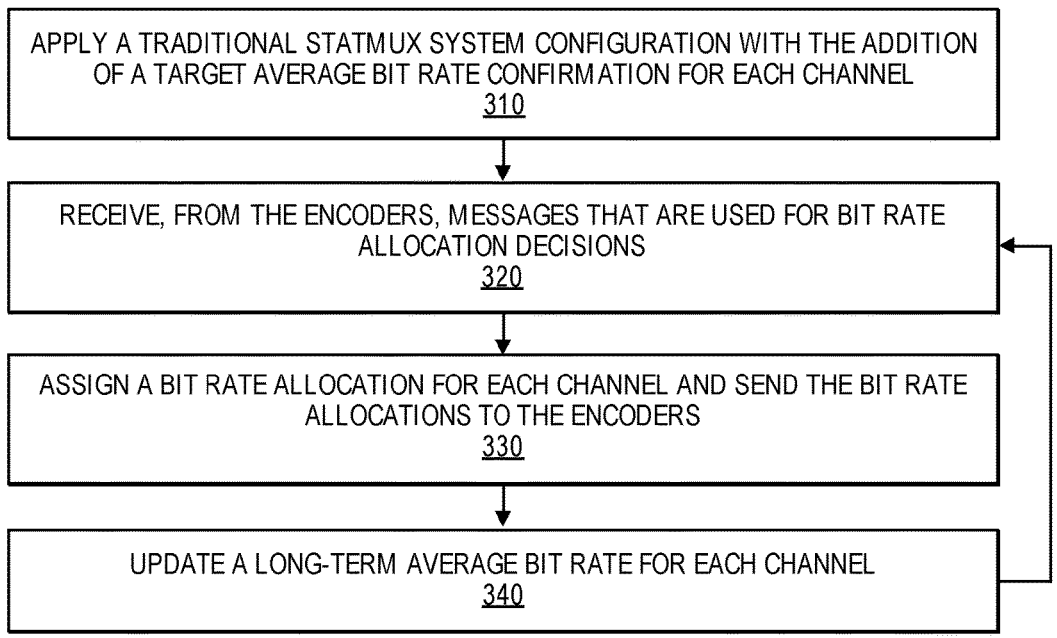
FIG. 3 is a flowchart illustrating the high-level steps of enforcing target average bit rates for each channel of a multiplexer over time according to an embodiment of the invention.

The operation of the components of FIG. 2 shall be explained below in the description of FIG. 3, which is a flowchart illustrating the high-level steps of enforcing target average bit rates for each channel of multiplexer 230 over time according to an embodiment of the invention.

In step 310, traditional statistical multiplexing ("statmux") is performed using encoders 220, 222, 224, and 226. Traditional statistical multiplexing technical are described above with reference to FIG. 1. While embodiments of the invention may be used in conjunction with traditional statistical multiplexing, it should be clear by the description of the steps of FIGS. 3 and 4 that embodiments constitute far more than mere prior art statistical multiplexing.

In addition, in step 310, embodiments establish an arbitrary target average bit rate for each channel. The arbitrary target average bit rate for a channel represents the target average bit rate at which content carried by the channel is to be delivered in a transport stream. Thus, in the example depicted in FIG. 2, step 310 may be performed by receiving four different arbitrary target average bit rates for each of the four channels in set of channels 280.

In an alternate embodiment, step 310 may be performed by receiving a single arbitrary target average bit rate that is to be applied to each of plurality of channels corresponding to set of channels 280.

Step 310 may be performed by a hardware or software component which receives input or instruction for a user or operator of system 200. Note that the particular arbitrary target average bit rate is arbitrary, that is to say the user or operator may choose any target average bit rate which is possible given the size of bit rate pool 270. Thus, certain embodiments may validate to a certain extent the target average bit rate supplied by the user based on the size of the bit rate pool 270, and offer guidance or warning to the user or operator if the supplied arbitrary target average bit rate is not obtainable given the size of the bit rate pool 270.

In step 320, messages that are used for bit rate allocation decisions are received by multiplexer 230 from each encoder in system 200. Thus, in the example of FIG. 2, multiplexer 230 would receive such messages in step 320 from encoders 220, 222, 224, and 226. There are a variety of different approaches which may be used by embodiments for determining the messages of step 320. Embodiments may use any approach for generating messages at an encoder which may be used by a multiplexer as a basis for bit rate allocation decisions.

In step 330, a bit rate allocation is assigned by multiplexer 230 to each channel and subsequently the assigned bit rate allocation is sent from multiplexer 230 to each encoder in system 200. Advantageously, in a single allocation cycle of multiplexer 230, bit rates are assigned to each of the encoders processing a channel in set of channels 280 from two or more portions of a bit rate pool Additional details about how step 330 may be performed by embodiments are provided below.

In step 340, the long-term average bit rate for each channel is updated. In an embodiment, step 340 may be performed by applying exponential smoothing or any other type of running average to bit rate allocations made by multiplexer 230. In an embodiment, an average bit rate tracking component of multiplexer 230 may perform step 340; for example, average bit rate tracking component 280, 282, 284, and 286 may track the long-term average bit rate for each channel. Note that the number of average bit rate tracking components in multiplexer is arbitrary and may generally correspond to the number of incoming channels to multiplexer 230.

Assigning Bit Rates to Channels Each Allocation Cycle

Figure 4:
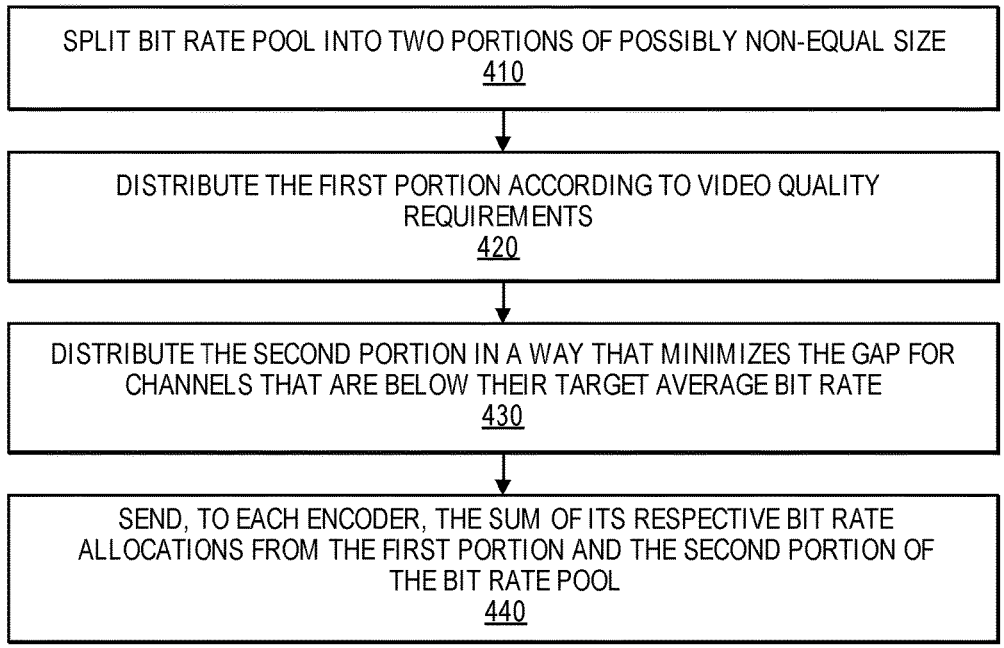
FIG. 4 is a flowchart illustrating the high-level steps of assigning bit rates to each channel in a single allocation cycle of a multiplexer according to an embodiment of the invention.

FIG. 4 is a flowchart illustrating the high-level steps of assigning bit rates to each channel of set of channels 280 in a single allocation cycle according to an embodiment of the invention. In step 410, bit rate pool 270 is split into two portions of possibly non-equal size. For example, bit rate pool 270 may be split in step 410 into first bit rate portion 272 and second bit rate portion 274. Note that the proportion of how bit allocation pool 270 is split between first bit rate portion 272 and second bit rate portion 274 may, and but need not, vary from one allocation cycle to the next allocation cycle.

First bit rate portion 272 is a portion or certain amount of bit rate pool 270 that is distributed amongst set of channels 280 to maximize the video quality of channels in the set of channels 280. Second bit rate portion 274 is a portion or certain amount of bit rate pool 270 that is distributed amongst set of channels 280 in a way that minimizes the gap for channels, in set of channels 280, which are below their target average bit rate. In each allocation cycle, how bit rate pool 270 is split into first bit rate portion 272 and second bit rate portion 274 may be determined such that a balance is maintained between video quality and having enough bit rates in second bit rate portion 274 to achieve successful convergence to the target average bit rate for each channel in the set of channels 280.

In an embodiment, bit rate pool 270 may be split into first bit rate portion 272 and second bit rate portion 274 using a convergence aggressiveness parameter, which is a configurable parameter which influences the proportion of bit rate pool 270 which is allocated to second bit rate pool 274 each allocation cycle. Embodiments may adjust the convergence aggressiveness parameter each allocation cycle. Such adjustment may be performed with the assistance of user-supplied input; however, such user-supplied input is optional and is not used by certain embodiments of the invention. An example of user-supplied input is an average ratio of the first bit rate portion 272 to the second bit rate portion 274 when measured over a certain interval of time.

In step 420, first bit rate portion 272 is allocated to encoders in system 200 according to video quality requirements by multiplexer 230. For example, first bit rate pool 272 may be allocated amongst encoders encoding each of set of channels 280 to maximize the video quality of channels in the set of channels 280.

In step 430, second bit rate portion 274 is allocated to encoders in system 200 by multiplexer 230. For example, second bit rate pool 274 is allocated amongst encoders encoding each of set of channels 280 in a way that minimizes the gap for channels that are below their target average bit rate.

In step 440, multiplexer 230 sends, to each encoder in system 200, the sum of its respective bit rate allocations from first bit rate portion 272 and second bit rate portion 274.

Advantageously, a broadcaster may use system 200 to broadcast each of the channels in set of channels 280 at an arbitrary target average bit rate, which may be desirable if the broadcaster undertakes a financial or contractual obligation to do so.

If a user does not wish to assign an arbitrary target average bit rate in step 310 to a program, then system 200 may assign an arbitrary target average bit rate for that program according to the bit rate that remains after all the arbitrary target average bit rate that the user provided are assigned. Note that it is possible that the sum of the arbitrary target average bit rates assigned to programs in the set of channels 280 be less than the size of the bit rate pool 270. Such circumstances would allow system 200 to operate beneficially and allow more of the bit rate pool 270 to be allocated according to quality requirements. In an embodiment, the convergence aggressiveness parameter may be adjusted over time to ensure the target average bit rate is achieved for each of set of channels 280. To illustrate, initially, the bit rate pool 270 may be split such that a greater share of bit rate pool 270 is assigned to first bit rate pool 272 and a lesser share of bit rate pool 270 is assigned to second bit rate pool 272. Thereafter, after some time has passed, a determination may be made that the arbitrary target average bit rate for a particular channel (the "lagging channel") in the set of channels 280 is less than the target average bit rate for that lagging channel. In response, the convergence aggressiveness parameter may be adjusted to shift the bias of the split bit rate pool 270 to favor the second bit rate pool 274 so that when future allocations are made, the portion of bit rate pool 270 which is apportioned into second bit rate pool 274 is greater than the share of bit rate pool 270 which is apportioned into first bit rate pool 272 until the arbitrary target average bit rate for each of the set of channels is equal or greater than the target average bit rate for the lagging channel.

IMPLEMENTATION EXAMPLES

In an embodiment, system 200 depicted in FIG. 2 may be implemented by one or more computer systems. A non-limiting, commercial example of a computer system on which system 200 may be embodied in the ProStream family of products available from Harmonic, Inc. of San Jose, Calif.

Figure 5:
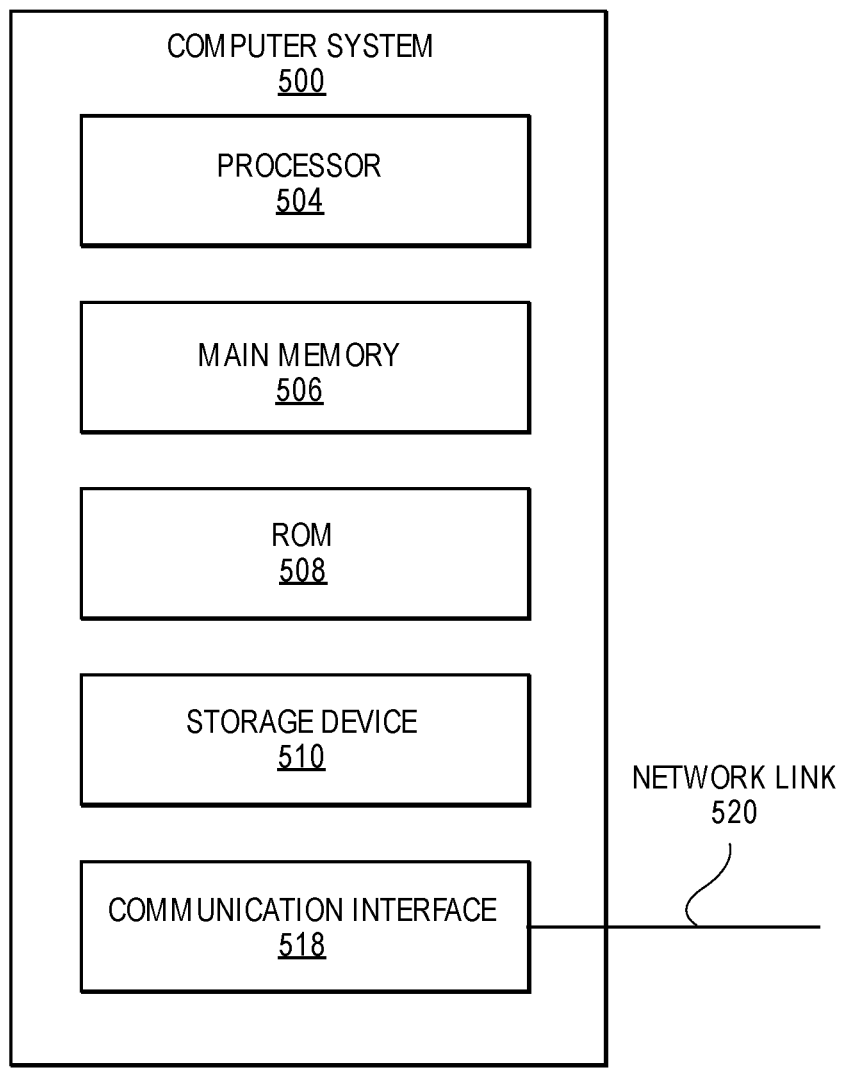
FIG. 5 is a block diagram that illustrates a computer system upon which an embodiment of the invention may be implemented.

FIG. 5 is a block diagram that illustrates a computer system 500 upon which an embodiment of the invention may be implemented. In an embodiment, computer system 500 includes processor 504, main memory 506, ROM 508, storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Embodiments of the invention are related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in storing instructions which may be provided to processor 504 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network link 520 to computer system 500.

Communication interface 518 provides a two-way data communication coupling to a network link 520 that is connected to a local network. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through a local network to a host computer or to data equipment operated by an Internet Service Provider (ISP).

Computer system 500 can send messages and receive data, including program code, through the network(s), network link 520 and communication interface 518. For example, a server might transmit a requested code for an application program through the Internet, a local ISP, a local network, subsequently to communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that stores one or more sequences of instructions for ensuring a long-term average bitrate for channels of a statistical multiplexing does not exceed a specified limit, which when executed by one or more processors, cause:

receiving an arbitrary target average bitrate for each channel of a set of channels of the statistical multiplexer;

tracking the long-term average bit rate for each of the set of channels of the statistical multiplexer;

for each allocation cycle of the statistical multiplexer, assigning bitrates to one or more encoders processing the set of channels of the statistical multiplexer by performing:

splitting a bit allocation pool of said statistical multiplexer into a first portion and a second portion, wherein the first portion is distributed amongst the set of channels to maximize video quality of the set of channels, and wherein said second portion is distributed amongst the set of channels to minimize a gap between the set of channels that are below their arbitrary target average bitrate based on the long-term average bit rate for the set of channels, allocating available bit rates from said first portion to said one or more encoders processing said set of channels of said statistical multiplexer, and allocating available bit rates from said second portion to said one or more encoders processing said set of channels of said statistical multiplexer; and wherein over a course of allocation cycles of the statistical multiplexer, assigning bitrates to each of the set of channels of the statistical multiplexer comprises:

initially splitting the bit allocation pool of said statistical multiplexer such that a greater share of the bit allocation pool is assigned to the first portion and a lesser share of the bit allocation pool is assigned to the second portion; and upon determining that, for a particular threshold of time, the long-term average bit rate for a particular channel is less than the target average bit rate for said particular channel, splitting the bit allocation pool of said statistical multiplexer such that a greater share of the bit allocation pool is assigned to the second portion and a lesser share of the bit allocation pool is assigned to the first portion.

2. The non-transitory computer-readable storage medium of claim 1, wherein the proportion of how said bit allocation pool is split between said first portion and said second portion varies from one allocation cycle to the next allocation cycle.

3. The non-transitory computer-readable storage medium of claim 1, wherein execution of the one or more sequences of instructions further cause:

assigning a particular arbitrary target average bit rate to a particular program based on a remaining bit rate that remains after all of a set of arbitrary target average bit rates provided by a user are assigned to other programs besides the particular program.

4. The non-transitory computer-readable storage medium of claim 1, wherein allocating available bit rates from said second portion to said one or more encoders is performed such that priority is assigned to a particular encoder processing a particular channel having a long-term average bit rate that has fallen furthest behind from the arbitrary target average bitrate associated with the particular channel.

5. The non-transitory computer-readable storage medium of claim 1, wherein tracking the long-term average bit rate for each of the set of channels is performed by applying exponential smoothing or running-average approximation to bitrate allocations to each channel of the set of channels.

6. The non-transitory computer-readable storage medium of claim 1, wherein the duration of time to reach the average bit rate depends on the complexity of the content in the set of channels and on a convergence aggressiveness parameter.

7. An apparatus for ensuring a long-term average bitrate for channels of a statistical multiplexing does not exceed a specified limit, comprising:

one or more processors; and one or more non-transitory computer-readable storage mediums storing one or more sequences of instructions, which when executed, cause:

receiving an arbitrary target average bitrate for each channel of a set of channels of the statistical multiplexer;

tracking the long-term average bit rate for each of the set of channels of the statistical multiplexer; and for each allocation cycle of the statistical multiplexer, assigning bitrates to one or more encoders processing the set of channels of the statistical multiplexer by performing:

splitting a bit allocation pool of said statistical multiplexer into a first portion and a second portion, wherein the first portion is distributed amongst the set of channels to maximize video quality of the set of channels, and wherein said second portion is distributed amongst the set of channels to minimize a gap between the set of channels that are below their arbitrary target average bitrate based on the long-term average bit rate for the set of channels, allocating available bit rates from said first portion to said one or more encoders processing said set of channels of said statistical multiplexer, and allocating available bit rates from said second portion to said one or more encoders processing said set of channels of said statistical multiplexer; and wherein over a course of allocation cycles of the statistical multiplexer, assigning bitrates to each of the set of channels of the statistical multiplexer comprises:

initially splitting the bit allocation pool of said statistical multiplexer such that a greater share of the bit allocation pool is assigned to the first portion and a lesser share of the bit allocation pool is assigned to the second portion; and upon determining that, for a particular threshold of time, the long-term average bit rate for a particular channel is less than the target average bit rate for said particular channel, splitting the bit allocation pool of said statistical multiplexer such that a greater share of the bit allocation pool is assigned to the second portion and a lesser share of the bit allocation pool is assigned to the first portion.

8. The apparatus of claim 7, wherein the proportion of how said bit allocation pool is split between said first portion and said second portion varies from one allocation cycle to the next allocation cycle.

9. The apparatus of claim 7, wherein execution of the one or more sequences of instructions further cause:

assigning a particular arbitrary target average bit rate to a particular program based on a remaining bit rate that remains after all of a set of arbitrary target average bit rates provided by a user are assigned to other programs besides the particular program.

10. The apparatus of claim 7, wherein allocating available bit rates from said second portion to said one or more encoders is performed such that priority is assigned to a particular encoder processing a particular channel having a long-term average bit rate that has fallen furthest behind from the arbitrary target average bitrate associated with the particular channel.

11. The apparatus of claim 7, wherein tracking the long-term average bit rate for each of the set of channels is performed by applying exponential smoothing or running-average approximation to bitrate allocations to each channel of the set of channels.

12. The apparatus of claim 7, wherein the duration of time to reach the average bit rate depends on the complexity of the content in the set of channels and on a convergence aggressiveness parameter.

13. A method for ensuring a long-term average bitrate for channels of a statistical multiplexing does not exceed a specified limit, comprising:

receiving an arbitrary target average bitrate for each channel of a set of channels of the statistical multiplexer;

tracking the long-term average bit rate for each of the set of channels of the statistical multiplexer; and for each allocation cycle of the statistical multiplexer, assigning bitrates to one or more encoders processing the set of channels of the statistical multiplexer by performing:

splitting a bit allocation pool of said statistical multiplexer into a first portion and a second portion, wherein the first portion is distributed amongst the set of channels to maximize video quality of the set of channels, and wherein said second portion is distributed amongst the set of channels to minimize a gap between the set of channels that are below their arbitrary target average bitrate based on the long-term average bit rate for the set of channels, allocating available bit rates from said first portion to said one or more encoders processing said set of channels of said statistical multiplexer, and allocating available bit rates from said second portion to said one or more encoders processing said set of channels of said statistical multiplexer; and wherein over a course of allocation cycles of the statistical multiplexer, assigning bitrates to each of the set of channels of the statistical multiplexer comprises:

initially splitting the bit allocation pool of said statistical multiplexer such that a greater share of the bit allocation pool is assigned to the first portion and a lesser share of the bit allocation pool is assigned to the second portion; and upon determining that, for a particular threshold of time, the long-term average bit rate for a particular channel is less than the target average bit rate for said particular channel, splitting the bit allocation pool of said statistical multiplexer such that a greater share of the bit allocation pool is assigned to the second portion and a lesser share of the bit allocation pool is assigned to the first portion.

14. The method of claim 13, wherein the proportion of how said bit allocation pool is split between said first portion and said second portion varies from one allocation cycle to the next allocation cycle.

15. The method of claim 13, further comprising:

assigning a particular arbitrary target average bit rate to a particular program based on a remaining bit rate that remains after all of a set of arbitrary target average bit rates provided by a user are assigned to other programs besides the particular program.

16. The method of claim 13, wherein allocating available bit rates from said second portion to said one or more encoders is performed such that priority is assigned to a particular encoder processing a particular channel having a long-term average bit rate that has fallen furthest behind from the arbitrary target average bitrate associated with the particular channel.

17. The method of claim 13, wherein tracking the long-term average bit rate for each of the set of channels is performed by applying exponential smoothing or running-average approximation to bitrate allocations to each channel of the set of channels.

18. The method of claim 13, wherein the duration of time to reach the average bit rate depends on the complexity of the content in the set of channels and on a convergence aggressiveness parameter.

\* \* \* \* \*